US011498542B2

(12) United States Patent
Praetorius et al.

(10) Patent No.: US 11,498,542 B2
(45) Date of Patent: Nov. 15, 2022

(54) METHOD AND CONTROL UNIT FOR OPERATING A BRAKE SYSTEM OF A VEHICLE

(71) Applicant: Robert Bosch GmbH, Stuttgart (DE)

(72) Inventors: Christian Michael Praetorius, Obersulm (DE); Verena Friedrich, Untergruppenbach (DE); Alexander Horvath, Korntal-Muenchingen (DE); Markus Hoffmann, Forchtenberg (DE); Markus Bartel, Untergruppenbach (DE); Nikolai Mueller, Bietigheim-Bissingen (DE); Stefan Bachmayer, Ludwigsburg (DE); Stefan Zahariev, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 16/525,960

(22) Filed: Jul. 30, 2019

(65) Prior Publication Data

US 2020/0031329 A1  Jan. 30, 2020

(30) Foreign Application Priority Data

Jul. 30, 2018 (DE) .................... 10 2018 212 635.6

(51) Int. Cl.
  *B60T 17/22*    (2006.01)
  *B60T 8/17*     (2006.01)
  *B60Q 9/00*     (2006.01)

(52) U.S. Cl.
  CPC .............. *B60T 17/221* (2013.01); *B60Q 9/00* (2013.01); *B60T 8/17* (2013.01)

(58) Field of Classification Search
  CPC ........ B60T 17/221; B60T 8/17; B60T 17/222; B60Q 9/00
  See application file for complete search history.

(56) References Cited

U.S. PATENT DOCUMENTS

| | | | |
|---|---|---|---|
| 8,712,626 B2 * | 4/2014 | Cahill | B60T 8/885 701/29.1 |
| 2009/0227423 A1 * | 9/2009 | Bentner | B60T 13/746 477/197 |
| 2016/0362095 A1 * | 12/2016 | Crombez | B60T 13/686 |
| 2018/0043876 A1 * | 2/2018 | Houtman | B60T 8/885 |

* cited by examiner

*Primary Examiner* — Pamela Rodriguez
(74) *Attorney, Agent, or Firm* — Maginot, Moore & Beck LLP

(57) ABSTRACT

A method for operating a brake system of a vehicle in a maintenance mode and in a normal mode includes providing a brake pressure in the brake system in the normal mode using a brake pressure generator. The method further includes preventing a provision of a brake pressure by the brake pressure generator in the maintenance mode.

13 Claims, 1 Drawing Sheet

METHOD AND CONTROL UNIT FOR OPERATING A BRAKE SYSTEM OF A VEHICLE

This application claims priority under 35 U.S.C. § 119 to patent application no. DE 102018212635.6 filed on Jul. 30, 2018 in Germany, the disclosure of which is incorporated herein by reference in its entirety.

BACKGROUND

Brake control systems can be delivered to vehicle manufacturers without a filling of brake fluid. For example, filling may only take place after the brake control system has been installed in the vehicle system. During maintenance and repair work on the brake system of a vehicle the brake fluid may also be removed—at least in some areas of the brake system—and replenished once the work has been completed. In the case of classic brake control systems, actuators (pressure building unit, valves) are usually only actuated in the case of driving dynamics control, for example in the case of brake intervention in the context of vehicle stabilization. No actuation is expected in the factory environment or in a workshop.

Newer brake systems with integrated brake force boosting or other means of brake pressure build-up via pumps, storage devices or plungers may also trigger actuators in the brake system independently of driver demands due to demands from other vehicle systems (for example in the context of a journey with traffic jams) or by self-diagnosis functions.

This can lead to situations in which a brake pressure build-up can have a negative impact on the environment, the device or the brake system. On the one hand, there is a risk that leaking or spraying brake fluid in a filled but not sealed state of the brake system will injure persons or contaminate the environment. Furthermore, unexpected automatic closing of the calipers while working thereon could lead to injury to people working thereon. Furthermore, devices can be damaged by unexpected pressure buildups in the unfilled state.

SUMMARY

The method according to the disclosure for operating a brake system of a vehicle includes a maintenance mode as well as a normal mode. In the normal mode, a brake pressure can be provided in the brake system by means of at least one brake pressure generator. In the maintenance mode, on the other hand, the provision of the brake pressure by means of the brake pressure generator is prevented. The provision of a normal mode and a maintenance mode has the advantage that normally permissible functions resulting from an internal or external braking demand, or a brake pressure build-up introduced from the outside into the system, for example by workshop staff that depress a brake pedal, can be inhibited in the maintenance mode when this can cause contamination, hazards or damage.

Furthermore, the disclosure concerns a control unit for carrying out such a method. The control unit comprises an interface for connecting a diagnostic unit, which can be connected to the control unit directly or indirectly via a data network of the vehicle. A diagnostic unit in the broadest sense is also understood to mean the use of operating and display instruments already present in the vehicle (for example displays, steering wheel, pedals, other switches and levers).

The possibility of connecting a diagnostic unit to the control unit, whether directly or indirectly, creates the possibility to record in the control unit whether the brake system is in a state in which maintenance is carried out. Similarly, there may be a test at the end of the production line in which a diagnosis is carried out by means of a diagnostic unit. This makes it possible to achieve a more reliable determination of a need to put the brake system into the maintenance mode.

Advantageous embodiments of the method and the control unit are the subject matter of the disclosure. In the design of the method, a switching state of an indicator is queried in a first step. The maintenance mode must be activated when the switching state of the indicator is active. The indicator thus holds the currently prevailing mode or the mode that is to be taken up in the control unit—i.e. the maintenance mode or the normal mode—characterized by its state. An indicator may be present in the form of a non-volatile memory, which retains its information—actively/inactively—even in the deenergized state. In a development of the method, the switching state of the indicator is queried in a second step, while the brake system is in the maintenance state. The maintenance mode is deactivated when the switching state of the indicator is inactive. The brake system is returned to normal mode. The indicator is monitored in the maintenance mode and in the normal mode with respect to the state thereof (active/inactive). This ensures that the system can also be brought into the currently correct and intended mode—following the indicator in each case.

In an advantageous embodiment, the switching state of the indicator is automatically and/or manually set to active. On the one hand, the switching state of the indicator can be automatically set to active as soon as a diagnostic unit is connected to the brake system. As a result, a maintenance mode is adopted immediately. Similarly, the indicator can be manually set to active if an activation demand, for example of a user, is received via a connected diagnostic unit and/or by using the operating or display elements present in the vehicle. For example, the user can manually put the brake system into the maintenance mode by appropriately pressing a button on a diagnostic unit. Manual activation of the maintenance mode may also be required after automatic activation, for example if a manual or automatic deactivation has previously taken place. It is also advantageous if the switching state of the indicator can be manually set to inactive. The switching state of the indicator can be manually set to inactive if a deactivation demand, for example, of a user, is received via a connected diagnostic unit and/or by using the operating or display elements present in the vehicle. It may also be provided that the indicator is automatically set to inactive when a normal driving mode of the vehicle is detected. Both possibilities of deactivation can also be provided. For safety reasons alone, it can be essential to put a brake system that is in the maintenance mode back into the normal mode as soon as the vehicle resumes the driving mode. Finally, the vehicle must be able to be braked safely. In doing so, a normal driving mode is assumed if either a speed greater than a speed limit is achieved, a steering actuation greater than a steering actuation limit is present, and/or an operating time exceeds an operating time limit. The limits allow reliable detection of when a driving mode is expected that requires an active brake system.

Furthermore, it is advantageous if the provision of the brake pressure by means of the brake pressure generator is prevented by suppressing the actuation of at least one electric actuator of the brake system or by switching at least one hydraulic component of the brake system so that no brake pressure is generated at at least one connection of a wheel brake of the hydraulic brake system.

A corresponding switching action can lead to closing a hydraulic line towards the wheel brake or to opening a hydraulic line away from the wheel brake, for example by appropriate switching of at least one hydraulic valve.

However, in the design of the method, in the maintenance mode inhibited provision of the brake pressure by means of the brake pressure generator is then allowed again provided that this is due to a demand on the part of the diagnostic unit. Intentional brake pressure buildups must be possible during maintenance, in test procedures at the end of the production line, or for bleeding a brake system. This can then be carried out in a safe manner by means of the diagnostic unit.

In the design of the control unit, this includes the indicator that is automatically set to active when a diagnostic unit is connected to the brake system and/or manually if an activation demand, in particular of a user, is received via the directly or indirectly connected diagnostic unit and/or by using the operating or display elements present in the vehicle interior.

In the further design of the control unit, the switching state of the indicator can be set to inactive automatically and/or manually. The switching state of the indicator can be manually set to inactive if a deactivation demand, in particular of a user, is received via a connected diagnostic unit and/or by using the operating or display elements present in the vehicle. Alternatively or additionally, the indicator can also be automatically set to inactive when a normal driving mode of the vehicle is detected. A normal driving mode can be assumed to be the result of a speed greater than a speed limit is achieved,
there is a steering actuation greater than a steering actuation limit, and/or
there is an operating time greater than an operating time limit.

Advantageously, because the indicator state is retained even without a connected current/voltage source, the indicator is a non-volatile memory element, which maintains its state when deenergized.

In the design of the control unit, the control unit outputs control signals that ensure the implementation of a braking demand for building up a brake pressure in the normal mode and prevent a brake pressure build-up in the maintenance mode. For example, braking demands applied to the control unit or braking demands that are triggered in the control unit can be implemented in the normal mode if this is allowed and intended, whereas this is prevented in the maintenance mode. In this process, inhibition is carried out using control signals that ensure that at least one electrical actuator of the brake system is inhibited, or at least one hydraulic component of the brake system is switched in such a way that no brake pressure is generated at at least one connection of a wheel brake of the hydraulic brake system, for example by closing a hydraulic line to the wheel brake or opening a hydraulic line away from the wheel brake by means of a hydraulic valve.

BRIEF DESCRIPTION OF THE DRAWINGS

In the following, an embodiment of the disclosure is described based on figures.

DETAILED DESCRIPTION

The disclosure is described below on the basis of a brake system that comprises at least one brake pressure generator. A brake pressure generator may generally mean a component of a brake system capable of directly or indirectly generating a brake pressure that causes a braking effect on the wheel brakes of a vehicle. In classic hydraulic brake systems, the braking effect is caused by hydraulic wheel brakes, which are controlled by a hydraulic pressure, which results in brake pads being applied to brake discs and in braking of the corresponding wheel. In such hydraulic brake systems, an actuator of the brake system can be understood to mean a brake pressure generator, such as a pump, a plunger, a high-pressure accumulator or even an active or passive brake force booster. Similarly, in such brake systems, a driver alone can cause a brake pressure by mechanically applying a force to a master brake cylinder, thereby creating a hydraulic pressure that is ultimately supplied to wheel brakes to generate the braking effect. An electromotive actuation of wheel brakes, possibly even without hydraulic transmission, is also conceivable and can be understood as a pressure generator. Brake systems can cause braking depending on the driver, for example by actuating a pedal or lever. The driver can be at least partly involved in the brake pressure build-up.

Actuators acting downstream of or even in parallel with the driver, such as pumps or brake force boosters, follow a normal braking demand of a driver or a driver's braking wish that the driver can specify by means of the operating travel of the pedal, for example. Such actuations can be determined by appropriate sensors, for example by a pedal travel sensor, a force sensor or a pressure sensor in a hydraulic unit.

Similarly, brake systems can also perform autonomous braking, in which braking is carried out independently of the driver's braking demand, for example (not exclusively) in the event of a traffic jam, an ACC function or automatic emergency braking.

The procedure is described below using a hydraulic brake system that can generate brake pressure on wheel brakes both depending on the driver and autonomously via hydraulic lines and thus press brake jaws together, whereby force is applied to a brake disc.

Figure 1:
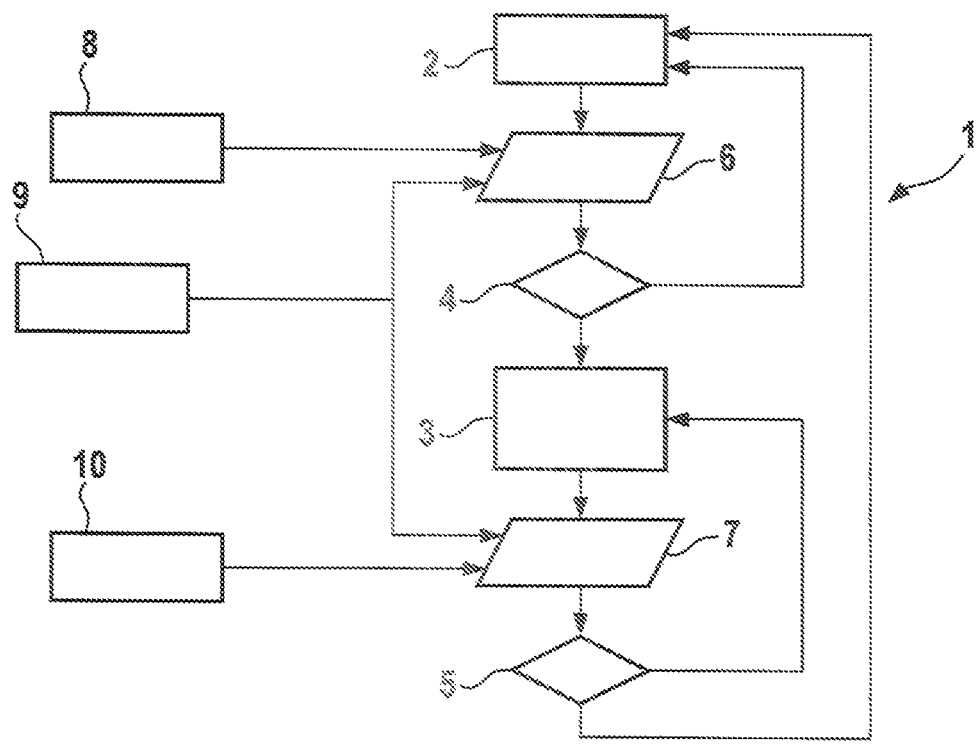
FIG. 1 shows a method for operating a brake system of a vehicle.

A method for operating such a brake system is described on the basis of FIG. 1. The brake system has a normal mode 2 and a maintenance mode 3. In the normal mode 2, braking can be carried out as usual, as mentioned, depending on the driver and/or autonomously, i.e. independently of the driver.

In the maintenance mode 3, a brake pressure build-up in the brake system is prevented, especially at the wheel brakes. A build-up of brake pressure can be prevented in different ways. On the one hand, a driver's braking demand, for example specified via the pedal travel of the brake pedal, may not be forwarded to the control unit 20 or, on the other hand, corresponding further processing of the measured variable in the control unit 20 may be prevented. Thus, despite the braking demand by a user, for example via the pedal, actuators are prevented from building up brake pressure following the user's braking demand. Similarly, a supply line for brake fluid can be inhibited by blocking sections of a hydraulic unit. In this way, closed inlet valves can prevent pressure prevailing in the hydraulic unit from reaching the wheel brakes.

Similarly, hydraulic fluid displaced towards the wheel brakes can be guided past the wheel brakes by opening the inlet valves but also opening the corresponding outlet valves. A supply of hydraulic fluid can thus be guided past the wheel brakes to a storage device or a reservoir. This, too, can prevent a build-up of pressure.

Furthermore, a brake pressure build-up can be prevented by inhibiting a motor control, for example a pump, a plunger or a brake force booster or by a very small control magnitude (current/voltage), if necessary even with a zero control magnitude.

However, the control of the brake system in the maintenance mode 3 may allow the actuators to be controlled by a connected diagnostic device.

However, all other actuations that would lead to pressure build-up in normal system operation are inhibited.

The method 1 shown in FIG. 1 is based on a normal state 2 of the brake system. In a normal state 2, the actuation of an actuator is due to a driver's braking demand, a self-diagnosis of the brake system, an intervention of a vehicle controller (for example a traction control system or an electronic stability program) and/or an externally triggered diagnosis. An actuator can be understood to be a pump, a plunger, an active brake force booster or a single wheel brake with its own motorized actuator. The brake system works to the full extent thereof in the normal mode.

Starting from the normal mode 2, an indicator 21 is monitored in a monitoring step 4. It is considered whether it has changed its switching state, in particular whether it is active. The indicator 21 is part of a control unit 20 of the brake system, which is described in FIG. 2. It is the task of the indicator to show whether the brake system is in the normal mode 2 (indicator=inactive) or in the maintenance mode 3 (indicator=active).

If the indicator 21 changes its switching state from inactive to active in a previous step 6, then the system is placed in the maintenance mode 3.

In a further monitoring step 5 during the maintenance mode 3, the indicator 21 is again monitored to identify whether it has changed from active to inactive. This corresponds to a cancellation condition for the maintenance mode. The system will return to the normal mode 2. Such a change from active to inactive takes place in a preceding step 7.

The switching steps 6 and 7, in which the indicator 21 is set from active to inactive, or vice versa, are considered in more detail below. It must be emphasized that the indicator 21 is in the "active" state from the outset in a delivery state of the brake system and the system is thus in the maintenance mode. This can be set to "inactive" for example after the final assembly and filling of the brake system in the vehicle, but at the latest at the first commissioning.

Starting from the normal mode 2 with the indicator inactive, the indicator 21 can be set from inactive to active in switching step 6. This can be carried out in different ways. On the one hand, the switchover can be carried out automatically 8. An automatic switchover 8 can be triggered by connecting a diagnostic device 27 to the vehicle, which leads to automatic switching 8 of the indicator 21. A diagnostic device 27 can be connected either directly to the control unit 20 of the brake system, for example during the final testing of the brake system after its manufacture, or also indirectly, for example via a diagnostic interface of the vehicle, wherein the communications between the control unit 20 and the diagnostic device can then be carried out via in-vehicle data networks. An indirect diagnosis can be carried out in a workshop.

Alternatively or additionally, it can be provided that the indicator 21 is switched over manually 9. A manual switchover 9 can be carried out by a user initiating a corresponding routine with the diagnostic device 27 connected, which should put the brake system into the maintenance mode 3. If there is a user demand to change the brake system to the maintenance mode 3, the indicator 21 is set from inactive to active.

Similarly, a manual switchover 9 can be carried out by a user initiating a corresponding routine using the operating system and display elements 29 present in the vehicle. The operating and display elements 29 transmit signals to the control unit 20 or are already present therein and thus also set the indicator 21 to active. Control and display elements can be understood to mean switches, buttons, rotary elements, pedals and/or control panels, such as a touch screen.

Both when automatically switching 8 the indicator from inactive to active, as well as when manually switching 9 the indicator from inactive to active, switching over the indicator 21 is detected in step 4, which puts the system into the maintenance mode 3. If it is determined in step 4 that the indicator 21 remains inactive, the brake system remains in the normal state 2.

In step 7, the indicator 21 is again set from active to inactive. This can be carried out on the one hand by a user initiating a routine for changing the brake system to the normal state when the diagnostic device 27 is connected, which switches the indicator 21 over. This can be understood as manual switching of the indicator 21. Switching the indicator from active to inactive can also be carried out by a user initiating a corresponding routine using the operating and display elements 29 present in the vehicle. The control and display elements 29 transmit signals to the control unit 20 or are already present in it and thus set the indicator 21 to inactive. Control and display elements can be understood as switches, buttons, rotary elements, pedals and/or control panels, for example a touch screen.

On the other hand, the switching of indicator 21 can also take place once the vehicle has changed to the normal driving mode. The normal driving mode can be determined on the basis of different variables. On the one hand, the normal mode can be present if there is a driving speed above a driving speed limit. On the other hand, a steering actuation greater than a steering actuation limit may indicate a normal mode. Furthermore, an operating time greater than an operating time limit may indicate a normal driving mode. A combination of these variables, as well as variables derived therefrom, is possible. Switching over the indicator 21 in the event of the normal driving mode can be understood as an automatic shutdown of the maintenance mode 3.

If it is determined in the monitoring step 5 that the indicator 21 is still active, the brake system is kept in the maintenance mode 3. If the indicator 21 has changed to inactive, the system is switched over to the normal mode 2.

Figure 2:
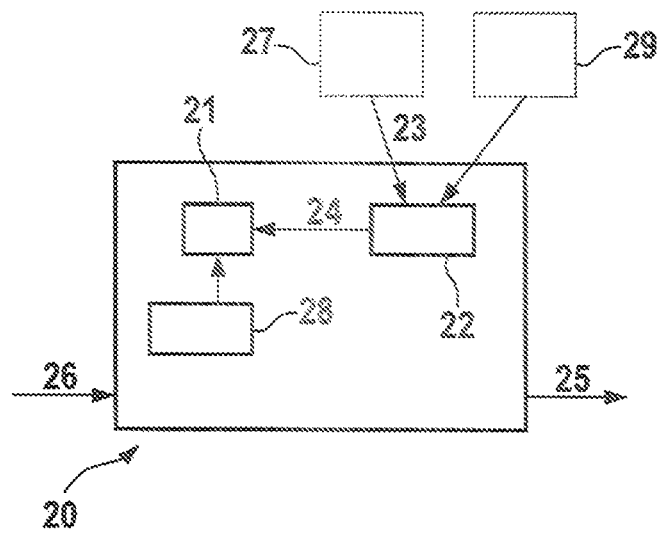
FIG. 2 shows a device for performing a method for operating a brake system of a vehicle.

The procedure 1 takes place on a control unit 20, which is shown in FIG. 2 by way of example. For the sake of simplicity, one control unit is described here, but it is conceivable that some of the functions are distributed among different control units, but this will not be described further here.

The control unit 20 comprises a port 22 for a diagnostic device 27, which can be connected to the diagnostic interface 22 directly or indirectly via a vehicle network. Said port 22 allows demands 23 to switch the brake system from the normal mode 2 to the maintenance mode 3 and back to be transmitted to the control unit 20. The demands 23 can switch the indicator 21 provided in the control unit 20 by means of signals 24. The port 22—i.e. the diagnostic interface 22—can also receive signals from operating and display elements 29, either from outside the control unit 20 or also in the form of variables that are already in the control unit 20. Thus, the diagnostic interface 22 can also switch the indicator 21 over by means of operating and display elements 29.

The diagnostic interface 22 can detect the active demand for a switchover from the normal mode 2 to the maintenance mode 3 by a user and can determine the mere presence of a connected diagnostic device 27 and can use it for switching over. The active demand can be made on the one hand via a diagnostic unit, or on the other hand by the actuation of operating and display elements 29 in the vehicle.

Deactivating the maintenance mode 2 based on a user demand at the diagnostic device 27 can also be forwarded from the diagnostic interface 22 to the indicator 21. The user demand can be transmitted on the basis of the diagnostic unit 27 or by means of operating and display elements 29.

The indicator 21 is in the form of a memory that is designed to be non-volatile and that has the logical states inactive/active. The non-volatile memory maintains its state (active/inactive) in the deenergized state.

The control unit also comprises a detection unit 28 that is capable of inferring the normal vehicle mode based on vehicle characteristics such as speed, use of the steering and/or operating time as described above. The detection unit 28 can cancel the maintenance mode 3 by switching the indicator 21 over while in the normal driving mode.

The control unit 20 is also capable of receiving and processing braking demands 26. Similarly, signals 26 concerning a braking demand can come from the control unit itself, for example for self-diagnosis of the system. Braking demands applied to the control unit from the outside can be signals from a brake pedal travel sensor. Braking demands 26 by other controllers in the vehicle are also possible. For example, a braking demand 26 can be sent out by an ACC system that requires a reduction in speed.

When implementing the braking demand 26, the control unit 20 takes into account whether the brake system is in the maintenance mode 3 or in the normal mode 2 and adjusts the implementation of the braking demand accordingly. The control unit then implements the optionally adapted braking demand 26 by issuing control signals 25 for components of the brake system accordingly. As already mentioned, this can be carried out in the maintenance mode 3 in the form of inhibiting the actuation of an actuator, for example a motor, or by appropriate switching of valves, so that a pressure build-up cannot take place.

What is claimed is:

1. A method for operating a hydraulic brake system of a vehicle in a maintenance mode and in a normal mode, comprising:
   generating a hydraulic brake pressure in the hydraulic brake system in the normal mode using a hydraulic brake pressure generator;
   preventing the generation of the hydraulic brake pressure by the hydraulic brake pressure generator in the maintenance mode;
   querying a switching state of an indicator as either active or inactive;
   activating the maintenance mode when the switching state of the indicator is active;
   connecting a diagnostic unit to a diagnostic interface of the vehicle; and
   setting the switching state of the indicator automatically to active when the diagnostic unit is connected to the interface.

2. The method according to claim 1, further comprising:
   querying the switching state of the indicator when the brake system is in the maintenance mode; and
   deactivating the maintenance mode when the switching state of the indicator is inactive.

3. The method according to claim 2, further comprising:
   switching over to the normal mode when the switching state of the indicator is inactive.

4. The method according to claim 1, further comprising:
   preventing the generation of the hydraulic brake pressure using the hydraulic brake pressure generator by switching at least one hydraulic component of the hydraulic brake system, such that no hydraulic brake pressure is generated at at least one connection to a wheel brake of the hydraulic brake system.

5. The method according to claim 4, wherein the prevention of the generation of the hydraulic brake pressure and the switching of at least one hydraulic component of the hydraulic brake system is performed by closing a hydraulic line to the wheel brake or opening the hydraulic line away from the wheel brake using a hydraulic valve.

6. The method according to claim 1, further comprising:
   enabling, in the maintenance mode, the generation of the hydraulic brake pressure using the hydraulic brake pressure generator by a demand on part of the connected diagnostic unit.

7. A method for operating a hydraulic brake system of a vehicle in a maintenance mode and in a normal mode, comprising:
   generating a hydraulic brake pressure in the hydraulic brake system in the normal mode using a hydraulic brake pressure generator;
   preventing the generation of the hydraulic brake pressure by the hydraulic brake pressure generator in the maintenance mode;
   querying a switching state of an indicator as either active or inactive;
   activating the maintenance mode when the switching state of the indicator is active;
   setting the switching state of the indicator automatically to inactive when a normal driving mode of the vehicle is detected; and
   setting the switching state of the indicator manually to inactive when a deactivation demand is received via a connected diagnostic unit.

8. The method according to claim 7, wherein the normal driving mode is present when a speed greater than a speed limit is achieved, when a steering actuation greater than a boundary steering actuation is present, and/or when an operating time greater than an operating time limit is present.

9. A control unit of a vehicle, comprising:
   an interface configured to operatively connect a diagnostic unit to the control unit;
   an indicator configured to be automatically set to active when the diagnostic unit is connected to the interface and/or configured to be manually set to active if an activation demand is received via the connected diagnostic unit,
   wherein the control unit is configured to operate a hydraulic brake system of the vehicle in a maintenance mode and in a normal mode by:

generating a hydraulic brake pressure in the hydraulic brake system in the normal mode using a brake pressure generator; and preventing the generation of the hydraulic brake pressure by the hydraulic brake pressure generator in the maintenance mode, wherein a switching state of the indicator is manually set to inactive if a deactivation demand is received via the connected diagnostic unit and/or the switching state of the indicator is automatically set to inactive when a normal driving mode of the vehicle is detected, and wherein the normal driving mode is present when a steering actuation greater than a steering actuation limit is present.

10. The control unit according to claim 9, wherein the indicator is a non-volatile memory element configured to maintain its state as active or inactive when the memory element is deenergized.

11. The control unit according to claim 9, wherein the control unit is configured to output control signals in order to ensure the generation of a braking demand for building up the hydraulic brake pressure in the normal mode and the prevention of the hydraulic brake pressure in the maintenance mode.

12. The control unit according to claim 11, wherein the control signals are configured to switch at least one hydraulic component of the hydraulic brake system, such that no hydraulic brake pressure is generated at at least one connection to a wheel brake of the hydraulic brake system.

13. The control unit according to claim 12, wherein the prevention of the generation of the hydraulic brake pressure and the switching of at least one hydraulic component of the hydraulic brake system is performed by closing a hydraulic line to the wheel brake or opening the hydraulic line away from the wheel brake using a hydraulic valve.

* * * * *